(12) United States Patent
Kisielewski et al.

(10) Patent No.: US 7,985,396 B2
(45) Date of Patent: Jul. 26, 2011

(54) PROCESS FOR PRODUCTION OF SODIUM BISULFITE

(75) Inventors: James Kisielewski, Green River, WY (US); Don Robertson, Green River, WY (US)

(73) Assignee: Solvay Chemicals, Inc., Houston, TX (US)

( * ) Notice: Subject to any disclaimer, the term of this patent is extended or adjusted under 35 U.S.C. 154(b) by 0 days.

(21) Appl. No.: 12/171,792

(22) Filed: Jul. 11, 2008

(65) Prior Publication Data

US 2010/0008845 A1 Jan. 14, 2010

(51) Int. Cl.
*C01B 17/62* (2006.01)
*C01B 17/42* (2006.01)

(52) U.S. Cl. ..................... 423/519; 423/519.2
(58) Field of Classification Search ............ None
See application file for complete search history.

(56) References Cited

U.S. PATENT DOCUMENTS

| | | | |
|---|---|---|---|
| 1,099,177 A * | 6/1914 | Howard | 423/519 |
| 3,542,511 A | 11/1970 | Shah | |
| 3,971,844 A | 7/1976 | Schneider | |
| 4,122,148 A | 10/1978 | Nicholson et al. | |
| 4,177,244 A * | 12/1979 | Neumann et al. | 423/243.09 |
| 4,216,189 A | 8/1980 | Nicholson et al. | |
| 4,261,962 A | 4/1981 | Dauerman et al. | |
| 4,313,924 A | 2/1982 | Pike | |
| 4,379,130 A | 4/1983 | Brady | |
| 5,266,296 A | 11/1993 | Bortle, Jr. et al. | |
| 5,366,716 A * | 11/1994 | Mattelmaki | 423/539 |
| 5,518,583 A | 5/1996 | Nykänen et al. | |
| 5,593,651 A | 1/1997 | Chane-Ching et al. | |
| 5,976,485 A * | 11/1999 | Zolotoochin et al. | 423/519 |
| 6,887,452 B1 | 5/2005 | Pecoraro et al. | |

FOREIGN PATENT DOCUMENTS

| | | | |
|---|---|---|---|
| DE | 3537949 | * | 4/1987 |
| EP | 0 672 447 | | 9/1995 |
| FR | 2 534 571 | | 4/1984 |
| GB | 1 087 090 | | 10/1967 |

OTHER PUBLICATIONS

"13. Sulfur Oxygen Acids and Their Salts," retrieved Feb. 12, 2007, from http://www.mrw.interscience.wiley.com/emrw/9780471238966/kirk/article/sulfweil.a01/current/html?hd=All,sodium&hd=All,metabisulfite#sulfweil.a01-sec1-0013 (5 pages).
Weil, E. D., et al., Kirk-Othmer Encyclopedia of Chemical Technology vol. 23 p. 47 (5th ed. 2004).

* cited by examiner

*Primary Examiner* — Melvin C Mayes
*Assistant Examiner* — Sheng H Davis
(74) *Attorney, Agent, or Firm* — Ryan L. Marshall; Brinks Hofer Gilson & Lione

(57) ABSTRACT

Processes for producing sodium bisulfite from sodium sulfite purge streams are disclosed which enable recovery of additional resource material including sodium bisulfite.

13 Claims, 1 Drawing Sheet

PROCESS FOR PRODUCTION OF SODIUM BISULFITE

BACKGROUND OF THE INVENTION

The present invention relates to a process for the manufacture of sodium bisulfite. More specifically, the invention relates to an improved process for manufacturing sodium bisulfite from a waste stream generated while producing sodium sulfite.

Sodium sulfite, $Na_2SO_3$, can be prepared by reacting sulfur dioxide gas, $SO_2$, in a solution containing a sodium source, e.g. sodium hydroxide (NaOH) or sodium carbonate ($Na_2CO_3$). A typical manufacturing process is described in U.S. Pat. No. 4,003,985 to Hoffman et al. Sodium bisulfite, $NaHSO_3$, can be prepared by reacting sulfur dioxide gas, $SO_2$, in a solution containing alkaline hydroxide, e.g. sodium hydroxide (NaOH) or sodium carbonate ($Na_2CO_3$). Also, under certain conditions, this reaction can produce sodium sulfite, $Na_2SO_3$. Reacting a solution of sodium sulfite with additional sulfur dioxide gas can produce sodium bisulfite.

Sodium bisulfite has a number of commercial uses including as a disinfectant, a bleaching agent, a food preservative, and as a mild reducing agent for removal of small amounts of chlorine, bromine, iodine, hypochlorite salts and oxygen (i.e. an oxygen scavenger agent).

Some commercial techniques for producing sodium sulfite use an evaporative crystallizer requiring a purge stream to remove impurities that can accumulate and contaminate a sodium sulfite product. The discharged purge stream normally consists of saturated sodium sulfite in water with sodium chloride, other water soluble impurities, and insoluble matter. The purge steam is typically discarded. The discarded sodium sulfite from the purge stream represents an inefficient loss of potentially recoverable and valuable resource material.

BRIEF SUMMARY OF THE INVENTION

A process for manufacturing a sodium bisulfite product is disclosed which includes the steps of providing an aqueous feed liquor for a sodium sulfite crystallizer by introducing alkali and introducing sulfur dioxide into the feed liquor to produce a first reaction liquor comprising sodium sulfite; introducing the first reaction liquor into a crystallizer; removing a purge stream from the crystallizer; introducing sulfur dioxide into the purge stream to form sodium bisulfite in a second reaction liquor; and recovering sodium bisulfite product from the second reaction liquor.

A process for manufacturing sodium bisulfite from a sodium sulfite purge stream is also disclosed which includes the steps of removing a purge stream from a sodium sulfite evaporative crystallizer to obtain a purge stream comprising sodium sulfite and sodium chloride in an aqueous solution; introducing sulfur dioxide into the purge stream removed from the crystallizer to react with the sodium sulfite and form sodium bisulfite; and recovering the sodium bisulfite formed in the purge stream.

The processes may also include the optional step of precipitating a sodium sulfite product from the first reaction liquor. The process may also include the optional step of introducing alkali to the crystallizer. The alkali may be selected from sodium hydroxide, sodium carbonate, and sodium bicarbonate. In some embodiments, sufficient alkali is introduced to maintain a pH of between 8.5 and 10.5 in the crystallizer.

The processes may be carried out with a purge stream having between about 1 and about 22 wt. % sodium sulfite and at least 0.1 wt. % sodium chloride, such as 21.5 wt. % sodium sulfite and 0.1 wt. % sodium chloride.

The processes may result in a second reaction liquor having at least 25 wt. % sodium bisulfite.

The production of sodium bisulfite may thus be obtained from any of the foregoing processes.

DETAILED DESCRIPTION

In some processes where a sodium sulfite product is crystallized by evaporation of water from a reaction liquor, an aqueous purge stream is taken from the evaporative crystallizer to remove water soluble impurities and insoluble matter that build up in the sodium sulfite production process. The purge stream also contains dissolved sodium sulfite and sodium chloride (NaCl). Thus, the purge stream removes contaminants from the crystallizer that would result in lower purity yields of the desired sodium sulfite product. Surprisingly, treatment of the discharged purge stream with sulfur dioxide can result in a commercially viable sodium bisulfite product. Thus, instead of discarding or storing the purge stream, that stream can be further processed to recover additional sodium bisulfite resource material. Such an improved process for making sodium bisulfite product can enable greater product yields by utilizing a purge stream taken from evaporative processing that is ordinarily discarded.

Figure 1:
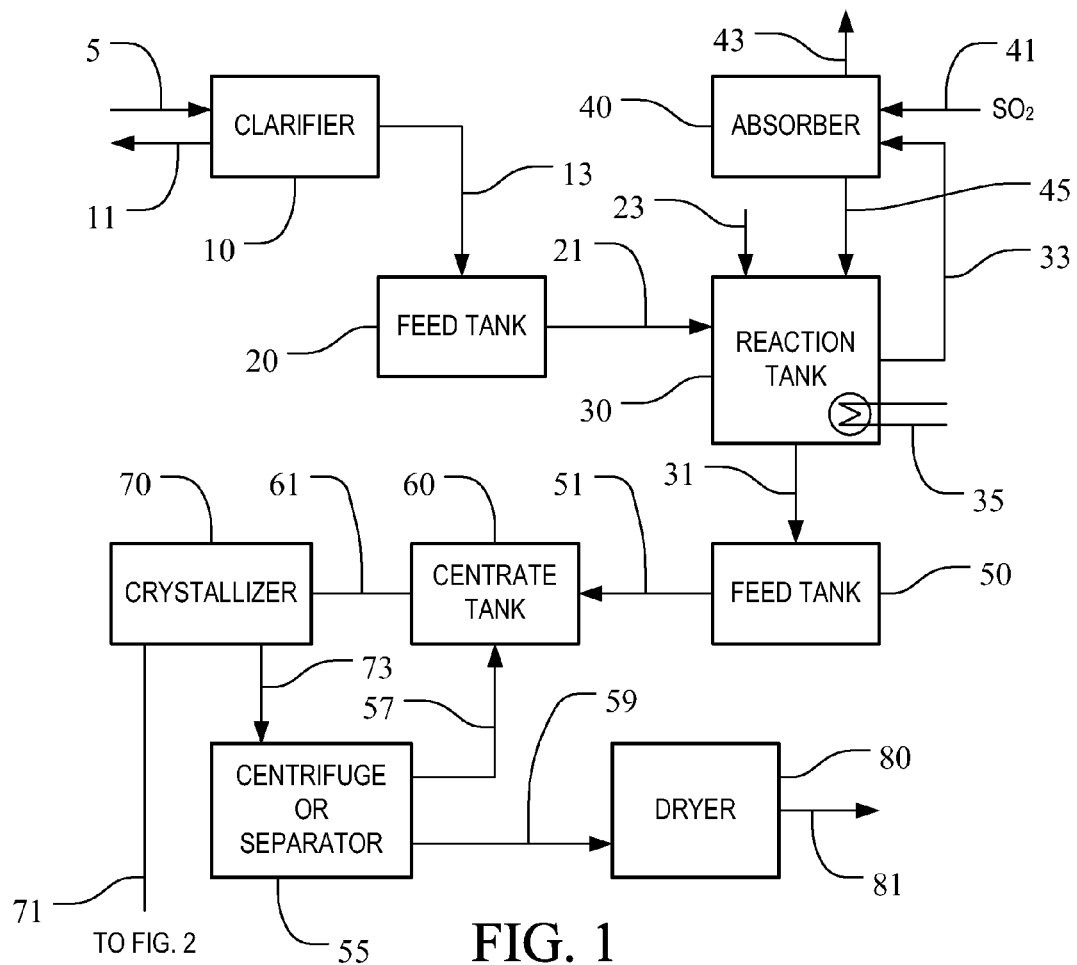
FIG. 1 depicts a block flow diagram of a process for producing sodium sulfite with a sodium sulfite purge stream.

In one embodiment, as shown in FIG. 1, an aqueous feed liquor comprising alkali, e.g. sodium carbonate, sodium hydroxide, and mixtures of any of the same, can be mixed with water to form an alkaline solution. In some embodiments, the alkali can be soda ash. In some embodiments, a chemical grade soda ash may be used because it has fewer impurities than crude or commercial grade soda ash. In other embodiments, cruder grades of soda ash can be used.

The alkaline solution may be passed via line 5 through an optional clarifier 10 where one or more metal precipitating agents (for example sodium dimethyldithiocarbamate (SDDC) or EDTA) may be added to remove undesirable metal contaminants from the alkaline solution via line 11. After optional clarification, the alkaline solution may be passed via line 13 and stored in an optional feed tank 20. The alkaline solution may also be passed through an optional pressure filter (not shown) to remove undissolved particulates at any point before or after the clarifier 10 or feed tank 20. In some embodiments, pumps may be present prior to filters to assist flow through the filters. In some embodiments, the feed tank can be a plurality of tanks, e.g. two, three, or four tanks. In other embodiments, the feed tank can be a single tank. The alkaline solution may be passed from feed tank 20 via line 21 to a reaction tank (or reactor) 30. In some embodiments, the reactor can be a plurality of tanks, e.g. two, three, or four. In other embodiments, the reaction tank can be a single tank.

In addition to the alkaline solution introduced to the reaction tank 30, sulfur dioxide is also added from an absorber 40. Sulfur dioxide is fed via line 41 as a gas to the absorber 40, e.g. the top of a packed bed absorption tower or eductor. An aqueous solution can be counter-currently run through the absorber, e.g. down the absorption tower, contacting sulfur dioxide containing gas. The sulfur dioxide containing gas can be generated by a sulfur burner or by removal from other industrial processes that produce sulfur dioxide gas. Any off gas from the absorber 40 can be removed through line 43 and optionally sent to a scrubbing system (not shown). Optionally, the scrubbing system may convert any sulfur dioxide present into sodium sulfite that can be separated. The off gas can contain sulfur dioxide not absorbed into the reaction liquor and other gases, e.g., oxygen ($O_2$), nitrogen, ($N_2$), and carbon dioxide ($CO_2$). The sulfur dioxide containing solution is taken from absorber 40 to reaction tank 30 via line 45. Mixture of the alkaline solution with sulfur dioxide provides a reaction liquor that can produce sodium sulfite. Reacting alkaline solution with sulfur dioxide is exothermic and can increase the temperature of the reaction liquor. In some embodiments, the reaction liquor is cooled by a cooling water stream 35 circulating through a heat exchanger (not shown) in the reaction tank 30. Alternatively, a side stream of reaction liquor may be circulated through a cooler (not shown) and returned to the reaction vessel. In other embodiments, the reaction liquor is not cooled, but is allowed to stand. It may be desirable to cool the reaction liquor since sodium sulfite is more soluble in a colder solution—that is sodium sulfite as a solute is more soluble at a lower temperature.

Additional water or alkali can be optionally added to the reaction liquor through line 23 into the reaction tank 30. For example, additional water may be desired to control the specific gravity (density) of the reaction liquor. Excessively high specific gravity reaction liquor which is returned to the absorber 40 via line 33 can result in fouling of the absorber column. Adding water to the reaction liquor before returning some or all of the liquor to the absorber 40 can lower the liquor's specific gravity to avoid fouling the absorber.

The reaction liquor may be removed from the reaction tank 30 via line 33 for recirculation through the absorber 40. In some embodiments, reaction liquor is continuously removed from the reaction tank 30 via line 33 and recirculated through absorber 40 before returning to the reaction tank 30.

The reaction liquor may also be removed via line 31 to a crystallizer 70. The reaction liquor passing through line 31 can optionally pass through one or more filters (not shown) or settling tanks (not shown), to remove insoluble matter, any unreacted alkaline solution, and sodium sulfite particles. It can be advantageous to remove this material because solid particles can have a deleterious effect on the crystallization of sodium sulfite product, in regard to crystal size, strength and impurities. It can also be advantageous to remove this material because these solid particles can reduce the purity of the sodium bisulfite product produced downstream.

In some embodiments, the reaction liquor may be taken to a crystallizer feed tank 50 before being delivered to the crystallizer 70. In some embodiments, the reaction liquor may be passed through a heat exchanger (not shown) to raise its temperature before being fed to the crystallizer 70, for example in any one or more of lines 31, 51, or 61. Hot water or another suitable heating medium can optionally be supplied to provide additional process heat. In some embodiments, the heat exchanger is absent. In some embodiments, there can be a plurality of heat exchangers.

In some embodiments, the reaction liquor can be passed via line 51 through a centrate tank 60 before entry into the crystallizer 70 via line 61. In some embodiments, the reaction liquor can be filtered with a filter (not shown) for removal of particulate matter. The filter may be present in line 31, 51, 61, or combinations of all three lines. In some embodiments, pumps may be present prior to filters to assist flow through the filters.

In some embodiments, alkali may be introduced into the crystallizer to control the pH of the solution in the crystallizer. The alkali increases the pH which can change the nucleation point and modify the fines crystal habit. For example, the pH can be increased and maintained between about 8.5 to 10.5, or preferably between about 9.6 and about 9.8. The particle size of crystals forming in the crystallizer can be affected by pH. For example, at pH 10.5, particle size is smaller than crystals formed at lower pH values. In addition, crystals formed at higher pH values can have more residual alkali in the crystal, up to 0.5% total alkalinity. At pH 8.5, particle size may be greater than crystals formed at pH 10.5, however, higher concentrations of insolubles may be captured in the crystals. In some embodiments, additional alkali is not added to the crystallizer 70.

Also, changes in sulfur dioxide solution or reaction liquor composition to the crystallizer can be compensated for by regulating the addition of alkali thereby improving the conditions for sodium sulfite product crystal growth. The concentration of alkali can range from about 1% to about 99%. In some embodiments, the alkali concentration can range from about 30% to about 70%. In some embodiments the alkali concentration can be about 50%. In some embodiments, the alkali solution may be used in place of, or in addition to, caustic soda, such as, but not limited to, a near saturated solution of soda ash, crystals of soda ash, or a sodium sulfite slurry. The caustic soda may be injected at the liquid surface in the crystallizer 70. In other embodiments, the caustic soda enters a circulation loop at a point just after the crystallizer feed addition. Caustic soda reacts with dissolved sulfur dioxide, which can be present at about 0.9 wt. %, with 10% alkali solution coming in with the crystallizer feed to produce a sodium sulfite product. The sodium sulfite product formed can increase the solution to a super saturation state which, consequently, can also increase the crystallizer yield of the sodium sulfite product.

Crystals of the sodium sulfite product that precipitate in the crystallizer 70, for example in the form of a slurry, can be passed through line 73 to a separator 55, e.g. a pusher centrifuge. In separator 55, reaction liquor, i.e. centrate, can be removed from the slurry and returned through line 57 back to crystallizer 70 directly or via centrate tank 60, thereby recovering additional sodium sulfite product and optionally recovering heat. The crystals from separator 70 can be passed to a dryer 80, e.g. co-current direct fired gas heated dryer, to dry the desired sodium sulfite product via line 59. The dryer can be operated at temperatures minimizing thermal decomposition of the sodium sulfite product. Sodium sulfite product is then recovered from the dryer via conveyor or line 81.

The evaporative crystallizer 70 can be heated to evaporate water. Solution saturated or supersaturated with sodium sulfite precipitates (crystallizes) sodium sulfite product with or on existing crystals in the slurry portion of the crystallizer.

A purge stream can be removed from the crystallizer 70 through line 71 carrying away impurities. In some embodiments, the top of the evaporative crystallizer 70 includes a baffle (not shown) that prevents crystals from the slurry from exiting the crystallizer in the purge stream.

The purge stream can consist of some amount of sodium sulfite (including an amount of sodium sulfite so that the solution is saturated in sodium sulfite) and some amount of brine. The amount of sodium sulfite may vary, and typically will be at or below 21.5 wt. % when the evaporative crystallizer operates under saturated conditions. The amount of sodium sulfite may also depend on the temperature and pH at which the crystallizer is operated. Thus, the amount of sodium sulfite present may vary from between about 1 and about 22 (e.g. 21.5) wt. %. The amount of sodium chloride may be present at range of between about 0% and 10 wt. %, or preferably between 1 and 5 wt. % or between 3 and 4 wt. %. The rate at which the purge stream is removed can be set based on monitoring the concentration of sodium chloride removed, for example a sodium chloride concentration of 3 wt. %.

Optionally, the purge stream can include additives. For example, a chelating agent such as sodium dimethyldithiocarbamate or EDTA may be added to the crystallization slurry to remove iron from the sodium sulfite product. The chelating agent is then removed from the process in the purge stream.

Figure 2:
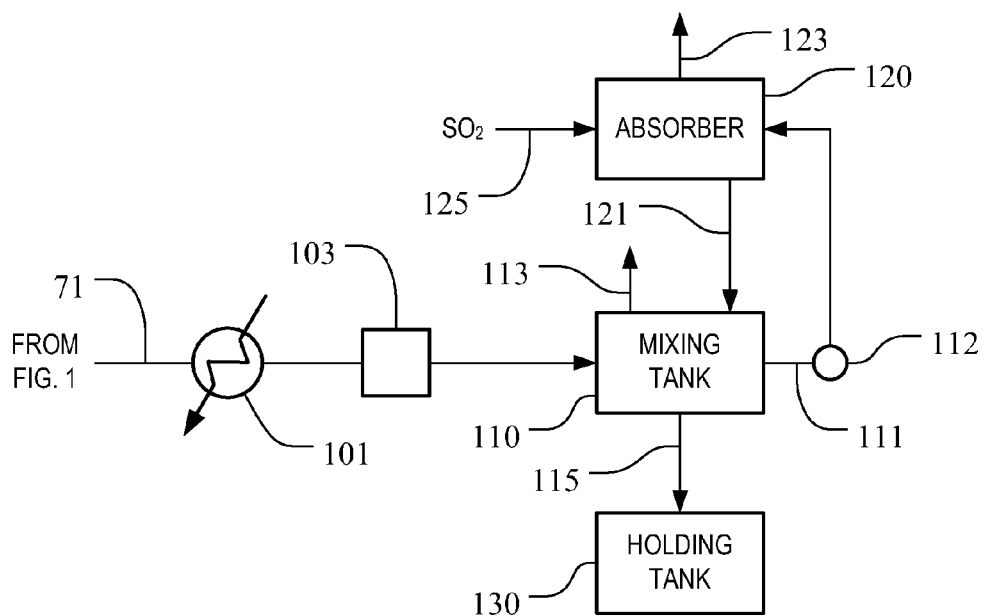
FIG. 2 depicts a block flow diagram of a process for producing sodium bisulfite from a sodium sulfite purge stream.

The removed purge stream can be processed to obtain sodium bisulfite. Referring to FIG. 2, the purge stream passing through line 71 from crystallizer 70 can be treated for recovery of sodium bisulfite product. In some embodiments, the purge stream passing through line 71 can be optionally passed through a heat exchanger 101 for heating or for heat recovery. The purge stream may also be optionally passed through a filter 103, e.g. a pressure leaf filter with 10 micron nominal filter cloths, for removal of undissolved particulates. In purge streams with undissolved particulates, the heat exchanger 101 may be used to cool the purge stream before filtration to reduce the solubility of dissolved impurities. When the filter leafs are fouled and require cleaning, the liquor held in the filter may be discarded or recycled back to the reaction tank 30 or the crystallizer 70. Optionally, the filters may be treated with caustic solution before passing the purge stream through the filters to also reduce the solubility of impurities in the purge stream.

The purge stream can be delivered to a mixing tank 110 to form a purge (or second) reaction liquor. Off gasses from the mixing tank 110 may be removed through line 113. The purge reaction liquor may be circulated e.g. by a circulating pump 112, through line 111 and passed through a second absorber 120, e.g. the top of a packed bed absorption tower or eductor. The purge reaction liquor can be counter-currently run through the absorber, e.g. down the absorption tower, contacting sulfur dioxide containing gas. The sulfur dioxide can be generated from a sulfur dioxide furnace or other industrial process (not shown) and fed to the second absorber 120 via line 125. Off gasses from the absorber may be removed through line 123. Alternatively, instead of being fed first to a mixing tank 110, the purge stream may be fed directly to the absorber 120.

The sodium sulfite in the purge stream is reacted with sulfur dioxide provided in the absorber 120 to form sodium bisulfite. The sulfur dioxide may be added using an absorber fan on a variable speed drive, allowing the rate of sulfur dioxide addition to be controlled. The sodium bisulfite can be prepared in batch or continuous feed processes and carried through line 121 to mixing tank 110 and subsequently a product solution may be removed via line 115 to a holding tank 130. In some embodiments, the sodium bisulfite product is recovered in an aqueous solution. The concentration of sodium bisulfite in the product solution recovered from the purge stream can be in the range of between 25 wt. % and 32 wt. %, such as in the range of between 26 wt. % and 30 wt. %. In some embodiments, the concentration of sodium bisulfite in the product solution recovered from the purge stream can be about 27 wt. %.

In some embodiments, the purge stream may be cooled. It should be understood that gaseous sulfur dioxide is more soluble in solution at cooler temperatures. Thus, cooling the purge stream can be advantageous to both filtering out undesirable particulates and increasing sulfur dioxide concentration to improve sodium bisulfite production. In other embodiments, no active cooling activity is applied to the purge stream.

In some embodiments, cooling of the sodium bisulfite solution can be done via any one or more of lines 111 or 115 with or without filtering to remove particulate impurities from the sodium bisuflite solution. In other embodiments, no active cooling is applied to the sodium bisulfite stream in lines 121 or 111.

The sodium bisulfite product solution recovered from this process may optionally contain some amount of sodium sulfite, e.g. up to about 0.5 wt. % sodium sulfite.

EXAMPLES

In a pilot plant study, sodium bisulfite was prepared from sodium sulfite crystallizer purge liquor. The apparatus used for the pilot study consisted of a 275 gallon plastic tote container, a centrifugal pump, a liquid jet eductor and hoses for connecting the components. The apparatus was operated on a batch basis. The container was initially filled with 250 gallons of crystallizer purge stream from a sodium sulfite crystallizer. The crystallizer purge stream used for feed in the test was a saturated solution of sodium sulfite at a temperature of 195° F., consisting of 21.5 wt. % sodium sulfite, 2.0 wt. % sodium chloride and the balance water. The crystallizer purge stream had a pH of 10.0 and a specific gravity of 1.18.

The filled container was then fitted with the liquid jet eductor. The liquor from the container was fed to the centrifugal pump and discharged through the jet eductor back into the container. A vapor line hose was installed from a sulfur furnace to supply sulfur dioxide to the jet eductor. The liquid flow through the eductor pulled gaseous sulfur dioxide into the circulating solution at a rate of 5-6 scfm. A vent line hose was also installed from the top of the container back to the sulfur furnace piping to allow inert gases to be returned to the sulfur furnace. The solution was recirculated in and out of the container at a flow rate of about 15 gpm.

Using this pilot apparatus, the recirculating sodium sulfite purge solution was treated with sulfur dioxide to convert the sodium sulfite to sodium bisulfite. Over a period of twenty-four hours, the solution pH was changed from about 10.0 to about 4.0. When the solution pH reached about 4.0, the batch cycle was completed and the sulfur dioxide flow from the sulfur furnace was stopped. The solution had a temperature of 90° F.

The solution at the completion of the batch cycle was analyzed as having 26.84 wt. % sodium bisulfite, 1.68 wt. % sodium chloride, and a pH of 4.02 and specific gravity of 1.248.

It should be appreciated that the examples and methods of the present invention are capable of being incorporated in the form of a variety of embodiments, only a few of which have been illustrated and described above. The invention may be embodied in other forms without departing from its spirit or essential characteristics. The described embodiments are to be considered in all respects only as illustrative and not restrictive, and the scope of the invention is, therefore, indicated by the appended claims rather than by the foregoing description. All changes which come within the meaning and range of equivalency of the claims are to be embraced within their scope.

What is claimed is:

1. A process for manufacturing a sodium bisulfite product, comprising:
reacting alkali and sulfur dioxide in an aqueous stream to produce a reaction liquor comprising sodium sulfite;

introducing the reaction liquor comprising sodium sulfite into a crystallizer where a sodium sulfite product is crystallized at a pH value of between 8.5 and 10.5;

removing a purge stream with a pH value greater than 7 comprising sodium sulfite from the crystallizer;

reacting sulfur dioxide with sodium sulfite in the purge stream to form a product liquor comprising sodium bisulfite.

2. The process of claim 1, further comprising introducing alkali to the crystallizer.

3. The process of claim 1, wherein the alkali is a reagent selected from the group consisting of sodium hydroxide, sodium carbonate, and sodium bicarbonate.

4. The process of claim 3, wherein the alkali is selected from the group consisting of sodium hydroxide and sodium carbonate.

5. The process of claim 1, wherein the purge stream comprises between about 1 and about 22 wt. % sodium sulfite and at least 0.1 wt. % sodium chloride.

6. The process of claim 5, wherein the purge stream comprises about 21.5 wt. % sodium sulfite.

7. The process of claim 1, wherein the product liquor comprises at least 25 wt. % sodium bisulfite.

8. A process for manufacturing sodium bisulfite from a sodium sulfite purge stream, the process comprising:

removing a purge stream with a pH value greater than 7 comprising sodium sulfite from an evaporative crystallizer where a sodium sulfite product is crystallized at a pH value greater than 7 to obtain a purge stream comprising sodium sulfite and sodium chloride in an aqueous solution;

reacting sulfur dioxide with sodium sulfite in the purge stream to form a product liquor comprising sodium bisulfite.

9. The process of claim 8, further comprising introducing alkali to the crystallizer.

10. The process of claim 9, wherein the alkali is a reagent selected from the group consisting of sodium hydroxide, sodium carbonate, and sodium bicarbonate.

11. The process of claim 10, wherein the alkali is selected from the group consisting of sodium hydroxide and sodium carbonate.

12. The process of claim 8, wherein the purge stream comprises between about 1 and about 22 wt. % sodium sulfite and at least 0.1% sodium chloride.

13. The process of claim 8, wherein the product liquor comprises at least 25 wt. % sodium bisulfite.

\* \* \* \* \*